Figure 1:
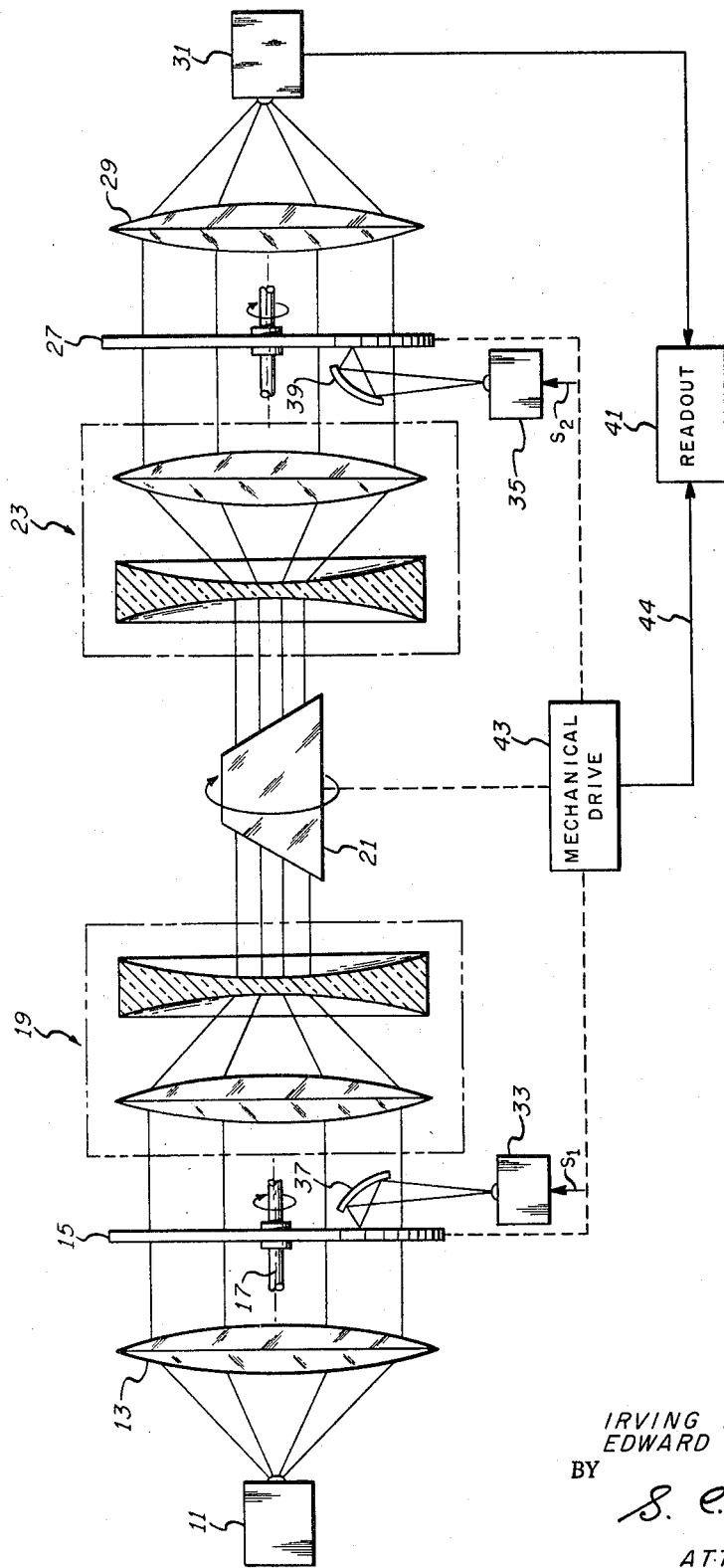

United States Patent Office 3,387,140
Patented June 4, 1968

3,387,140
OPTICAL SIGNAL CORRELATOR USING ROTARY PHOTOCHROMIC RECORD MEANS
Irving Roth, Williston Park, and Edward W. Stark, Garden City, N.Y., assignors to Sperry Rand Corporation, Great Neck, N.Y., a corporation of Delaware
Filed June 21, 1965, Ser. No. 465,496
9 Claims. (Cl. 250—236)

The invention herein described was made in the course of or under a contract or subcontract thereunder, with the Department of the Navy.

This invention relates to optical correlation techniques and more specifically to optical signal delay analyzers.

Computers are frequently required for determining the instant at which the characteristics of one signal most nearly approximate the characteristics of another signal. Correlation techniques are commonly used for this purpose and many devices for implementing these techniques have been invented.

In some of the prior art devices, photographic or similar records are made of each of the two signals and then the two records are compared. In this technique, however, considerable time is required to complete a measurement, so that the technique is not applicable in situations in which real time measurements are required.

Similar optical systems employing light sensitive dyes have been devised. These systems, however, employ intermittent scanning so that the incoming signals cannot be monitored continuously.

Still other schemes have been devised in which each of the signals to be compared is converted into a sonic wave. Each of the sonic waves is then passed through an individual transparent sonic delay line. The sonic waves, in passing through the delay lines, cause local changes in the mass density and therefore in the index of refraction of the line material. A collimated beam of light is passed through both delay lines at right angles to the direction of propagation of the sonic wave. The location at which corresponding points on the two sonic waves coincide is used as a measure of correlation. This scheme is limited to relatively short delay lines in order to keep the optical system within a reasonable size. Devices built according to this scheme are not suited to low frequency measurements because of the cumbersome optical system such measurements would entail.

It is an object of the present invention to provide a correlator that can operate in real time.

It is another object of the present invention to provide a correlator that does not require excessively broad collimated beams.

It is another object of the present invention to provide a correlator that can operate at relatively low frequencies.

It is yet another object of the present invention to provide a correlator that supplies a time domain readout.

It is still another object of the present invention to provide a correlator that can measure time delays between two functions continuously.

These and other objects are achieved by providing optical means that record each signal instantaneously and then continuously sweep the image of the record of one signal over the record of the other signal.

The principles and operation of the invention can be understood by referring to the following description and the accompanying drawings.

Figure 2:
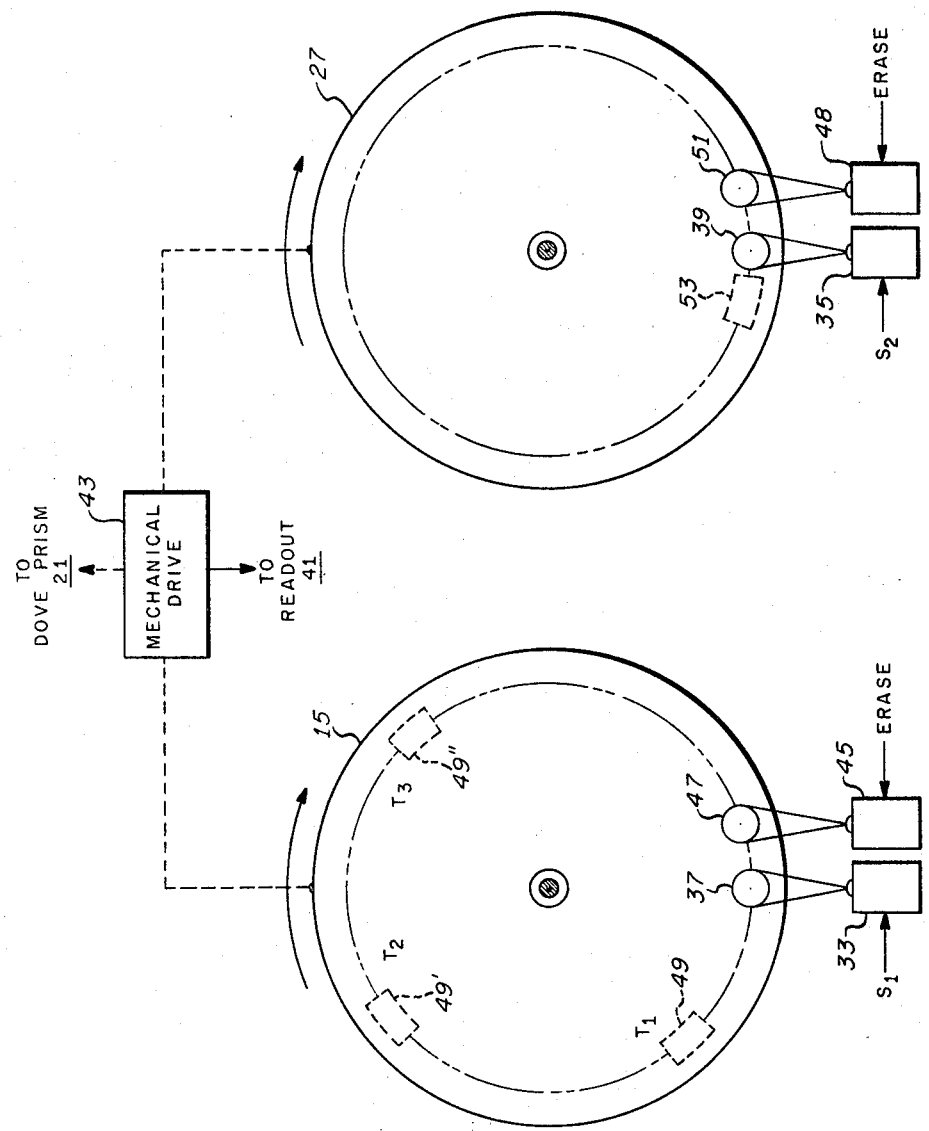

FIG. 1 is a schematic diagram illustrating an optical system that can be used in practicing the invention, and FIG. 2 is a diagram useful in explaining the operation of the invention.

The invention utilizes the peculiar nature of photochromic materials. These materials, which are known to the prior art, contain molecules that can exist in any one of several states. In a first state, the molecules are transparent. Light of a proper wavelength, such as ultraviolet light, will excite the molecules into a second state in which they are opaque. Light of a second wavelength, such as yellow or red light, will cause the molecules in the second state to return to the first state so that the material again becomes transparent. Light of a third wavelength, such as green light can be used to read out the patterns on the photochromic material without affecting its opacity in either way.

A correlator built according to the principles of the present invention is shown schematically in FIG. 1. A source of READ light 11 provides a beam of light which passes through a first collimating lens 13 so as to flood a first photochromic disk 15 with a substantially uniform beam of light. The photochromic disk 15 serves as a record means to store information during correlation. The disk comprises a suitable backing material having a transparent annular section that is coated on one surface with a photochromic dye. The rest of the backing material is preferably opaque. The amount and pattern of the light passing through the disk is dependent upon the opacity patterns established in the dye surface. The disk is arranged to rotate around its axis 17.

Light passing through the disk 15 falls on a pair of converging lenses 19 so that the beam of light is reduced in diameter. This reduced diameter beam is then passed through an image rotating means 21.

The image rotating means may consist of any suitable device that will cause the projected image from the photochromic disk 15 to rotate about the optical axis. The presently preferred embodiment utilizes a Dove prism for this purpose.

Dove prisms are well-known in the art. They invert an image for each 90° of rotation of the prism so that the image is rotated at twice the speed at which the prism is rotated with respect to the incident light beam.

The light emerging from the Dove prism is passed through a pair of diverging lenses 23 and a second photochromic disk 27. Light from the photochromic disk 27, which serves as a second record means, then passes through a collecting lens 29 where it is formed into a concentrated beam that falls upon a photodetector 31. Since the READ light passes serially through each of the optical elements, the total light falling on the photodetector is a function of the transmission characteristics of each of these elements.

The two photochromic disks 15 and 27 are rotated at the same speed and in the same direction. The Dove prism is also rotated about its axis, but at a different speed, so that it moves relative to the two photochromic disks.

The Dove prism produces an image that rotates at twice the speed at which the prism is rotating relative to the photochromic disk 15. Thus the projected image of the disk 15 will scan the photochromic disk 27 at twice the difference in speeds of the prism and the disk 15.

The first of the signals to be compared is used to modulate a first WRITE source 33 and the second of the signals to be compared is used to modulate a second WRITE source 35. The light from the source 33 is applied to a suitable reflector 37 which focusses the light beam on the first photochromic disk. Similarly, light from the second WRITE source is applied to a second reflector 39 which focusses the beam on the second photochromic disk 27.

The photodetector 31 produces an instantaneous output signal which is a measure of the total light reaching the detector at any given time. The signal from this detector may be read out directly as a time delay.

The readout means may be calibrated in terms of any unit suitable for the particular application. For instance, in some situations a direct reading of time delay may be preferred whereas in other situations, a readout in terms of some derived unit such as distance or angle of arrival of an incoming signal may be more convenient.

The mechanical drive system 43 serves to rotate the photochromic disks and the Dove prism at the desired speeds. A synchronizing signal is also supplied by the mechanical drive means through a line 44 so that the relationship between the instantaneous position of the rotating members and the resultant signal from the photodetector 31 may be determined.

The ERASE means can be visualized by referring to FIG. 2 in which the disks 15 and 27 are shown side-by-side so as to illustrate operation of the device. The modulated light sources 33 and 35 are positioned below the respective disks with the corresponding ERASE light sources 45 and 48 positioned alongside. The light from the ERASE light source 45 is directed on to a reflector 47 which focusses the beam on a small area of the disk 15. Similarly, light from the ERASE source 48 is directed onto a reflector 51 which focusses the beam on a small area of the disk 27.

The ERASE sources provide steady beams of light having a color suitable to reverse any opacity changes caused by the associated WRITE means. The ERASE light beams are positioned so that any signal recorded on a disk will remain thereon for almost an entire revolution of the disk.

The WRITE source, the READ source, and the ERASE source each provides a light beam of a suitable color to perform the desired function. In a typical device, the WRITE source may contain a xenon lamp that produces a red light. This will function so that a high level input signal produces a transparent segment on the associated photochromic disk whereas a low level signal permits the corresponding portion of the disk to remain opaque. The ERASE source may contain a mercury lamp which produces ultraviolet light so as to render the irradiated surface of the disk opaque. The READ light source may provide a green light which does not affect the opacity of the disks.

In situations demanding high writing speeds, modulated lasers may be used as WRITE sources. The high radiance of laser beams can be utilized to effect a rapid transition in the opacity of the photochromic material.

As presently preferred, the Dove prism is rotated at a speed faster than that of the photochromic disks so that the pattern of the first disk scans the second disk several times during a complete revolution of the disk.

The operation of the device can be understood by referring to FIG. 2. Assume a situation in which a signal is subjected to an unknown delay and the magnitude of this delay is to be measured. The undelayed signal, $S_1$, is applied to the first WRITE source 33 and the delayed signal, $S_2$, is applied to the second WRITE source 35.

The signal may comprise a single pulse or a pulse train. The undelayed signal will be recorded in an area designated generally as a rectangle 49 in FIG. 2. As the disk 15 rotates, the area 49 moves clockwise along an annular path indicated as a dashed line on the disk 15. The total amount and the pattern of light from the READ source that is transmitted through the disk 15 is thus dependent upon the signal recorded on the disk.

The projected image of the signal recorded in area 49 is caused to sweep around an annular path on the disk 27 by the action of the image rotating means. So long as no signal is applied to the second WRITE means, however, the annular path on the disk 17 remains opaque and no light reaches the photodetector.

Each complete scan occurs in a definite time interval during which the disks and the image rotating means rotate through a predetermined angular increment. Therefore the angular displacement of these members can be used as a measure of time delay between pulses.

At the end of the first scan, the area 49 in which the signal $S_1$ was recorded will have reached a position as indicated in FIG. 2. This will have occurred during an interval $T_1$. If no delayed signal was received during this interval, the disk 27 will have remained opaque and no signal will be generated by the photodetector.

Similarly, if no delayed signal was received during the second scanning interval $T_2$, the signal area would be in the position 49' at the end of the interval, but no signal would have been generated by the photodetector.

In the same fashion, the signal area would be in position 49" at the end of the next scanning interval $T_3$.

Assume however that the delayed signal $S_2$ modulates the write source 35 during this third interval. This will generate a record in an area such as the area 53 on the disk 27. As the image of the signal recorded on the disk 15 scans the disk 27, a burst of light will be transmitted through the latter disk when the image coincides with the signal area 53. The burst of light will reach its maximum intensity at the instant of exact coincidence.

Since the image of the first disk can be made to scan the second disk many times during each revolution of the disks, the disks can be made to rotate relatively slowly and the record on the disk 15 can be retained for a considerable length of time. Long delay times can be measured and low frequency signals can be accommodated.

The signals may be of longer duration than indicated in FIG. 2. In such a case, the maximum intensity of the light reaching the photodetector will still be an indication of exact coincidence.

In many instances, the signals are not truly identical. They are often received in the midst of considerable background noise which tends to mask their true nature. Under these circumstances, some light may reach the photodetector during the entire scan cycle. However, maximum light transmission will still occur at the instant of greatest coincidence.

Since the received signals are recorded almost instantaneously and can be read out at once, the device operates in real time. Changes in the signals can be detected as they occur.

The converging and diverging lenses are used to permit the use of relatively large photochromic disks together with a small Dove prism. These lenses, however, are not essential to the invention.

Since all the light passing through the optical system is focussed on the photodetector and the output signal is always a function of the total light transmitted at that instant, the device provides a time domain readout.

Subsequently received signals can be recorded even before previously recorded signals are erased. The device can receive and measure continuous signals.

Although the description has been limited to a device in which a strong WRITE signal is represented by a transparent segment on the disk, it will be obvious that the operation can be reversed so that a strong WRITE signal is represented by an opaque segment on the disk. Alteration of the opacity from either state to the other is determined by the colors chosen for the WRITE and ERASE sources.

A plurality of input signals can be recorded on a given disk by arranging the various READ and ERASE means so as to use concentric annular paths on the disks. In such stiuations, optical systems can be used such that the light from each path is collected separately and applied to individual photodetectors.

While the invention has been described in its preferred embodiments, it is to be understod that the words which have been used are words of description rather than of limitation and that changes within the purview of the appended claims may be made without departing from the true scope and spirit of the invention in its broader aspects.

What is claimed is:

1. In combination: first and second photochromic record means; image rotating means positioned between the individual record means; means to pass a collimated beam of READ light serially through both of said record means and said image rotating means; photodetector means positioned to receive the light passing through the second record means; means to record first and second trains of input signals as opacity variations in continuous paths on said first and second record means respectively; means to erase the signals recorded on said record means; said image rotating means being timed to scan the image of the opacity variations of the first record means over the recorded signal path of th e second record means several times before a given signal is erased; and readout means to provide an indication of the instantaneous position of said image and the resultant light reaching said photodetector.

2. In combination: first and second photochromic record means; image rotating means positioned between the individual record means; means to pass a beam of READ light serially through both of said record means and said image rotating means; photodetector means positioned to receive the light passing through the second record means; means to record first and second trains of input signals in continuous paths on said first and second record means respectively; means to erase the signals recorded on said record means; said image rotating means being operative to project an image formed by the beam of READ light in passing through the first record means on to the second record means, said image rotating means being timed to scan the image thus projected over the recorded signal path of the second record means several times before a given signal is erased; and readout means to provide an indication of the instantaneous position of said projected image and the resultant light reaching said photodetector.

3. In combination: first and second photochromic record means; image rotating means positioning between the individual record means; to pass a beam of READ light serially through both of said record means and said image rotating means; photodetector means positioned to receive the light passing through the second record means; first and second modulated WRITE light sources responsive to first and second input signals respectively, said first and second WRITE light sources being arranged to expose successive points in continuous paths on said first and second record means respectively; means to erase the signals recorded on said record means; said image rotating means being operative to project an image formed by the beam of READ light in passing through the first record means on to the second record means, said image rotating means being timed to scan the image thus projected over the recorded signal path of the second record means several times before a given signal is erased; and readout means to provide an indication of the instantaneous position of said projected image and the resultant light reaching said photodetector.

4. In combination: a pair of photochromic disks; image rotating means positioned between said photochromic disks; means to pass a beam of READ light serially through said photochromic disks and said image rotating means; means to collect said READ beam; means to record first and second trains of input signals in annular paths on said first and second photochromic disks respectively; means to erase said recorded signals; said image rotating means being timed to cause several complete rotations of a projected image before a recorded signal is erased; and means to correlate the instantaneous position of a projected image and the resultant quantity of light being collected by said collection means.

5. In combination: first and second photochromic disks; means to pass a beam of READ light serially through said photochromic disks and said image rotating means; said image rotating means being disposed so as to project a rotating image of an opacity pattern formed by said first photochromic disk on to said second photochromic disk; photodetector means arranged to receive all of the READ light passing through said second photochromic disk; means to alter the opacity of successive segments of annular paths on said first and second photochromic disks in response to first and second input signal trains respectively; means to return the opacity of said segments to an original condition at a predetermined time after alteration; said image rotating means being timed to cause several complete rotations of the projected image of a particular segment while in the altered condition; and means to correlate the total time during which a given segment has been in the altered state and the instantaneous output of said photodetector means.

6. In combination: first and second rotatable photochromic disks; image rotating means positioned between said disks; a photodetector; a source of READ light disposed so as to pass a beam of light serially through said disks and said image rotating means on to said photodetector; means to project a first WRITE beam on to a small area of said first photochromic disk and a second WRITE beam on to a small area of said second photochromic disk in response to first and second input signals respectively whereby an annular path of variable opacity may be recorded on each disk as it rotates; said image rotating means being operative to project an image of the opacity pattern recorded on said first disk on to said second disk; means to project ERASE beams on to a small area of each disk adjacent to the respective WRITE beams so that successive portions of the recorded opacity pattern are erased just before each portion is again exposed to a WRITE signal; said image rotating means being further arranged to rotate the image projected on to said second photochromic disk several times during one revolution of the photochromic disk; and readout means connected to correlate the instantaneous position of the photochromic disks and the resultant photodetector output.

7. A signal delay analyzer comprising first and second photochromic disks rotatable about their central axes; means to vary the opacity of segments in an annular path of said first disk in response to a first signal; means to vary the opacity of segments in an annular path of said second disk in response to a second signal; an image rotating means; means to project an image of the opacity pattern of said first disk on to the image rotating means; means to project the light pattern emerging from the image rotating means on to the second photochromic disk; means to actuate said image rotating means so that the image from said image rotating means scans the second photochromic disk; means to indicate the total instantaneous quantity of light passing through said second photochromic disk; and means to correlate the instantaneous annular position of the first disk with the instantaneous quantity of the light passing therethrough.

8. A signal delay analyzer comprising means to provide a collimated beam of READ light; a photodetector arranged to receive said collimated beam; first and second photochromic disks arranged in parallel planes so that their central axes lie along the optical axis of said collimated beam; means to rotate said disks at the same speed about their central axes; a Dove prism disposed coaxially with said collimated beam and between said photochromic disks; first and second modulated WRITE light sources responsive to first and second input signals respectively, said first and second WRITE light sources being arranged to focus beams of light on said first and second discs respectively in small areas located eccentrically with respect to the optical axis of said collimated beam, ERASE means adjacent each of said WRITE light sources to remove a previously recorded signal from a small area of a photochromic disk before exposure to the beam from a WRITE light source; means to drive said Dove prism so that the image projected by the prism rotates several times during a single rotation of said photochromic disks; and a readout means connected to receive the output of said photodetector, said readout means being further synchronized with a rotation of said Dove prism.

9. A signal delay analyzer comprising first and second rotatable photochromic disks arranged coaxially in parallel planes; a Dove prism disposed between and coaxial with said photochromic disks; a source of READ light, said light having a color that is ineffective to change the opacity of said photochromic disks; a photodetector; said source of READ light being arranged to direct a collimated beam of light coaxially and serially through said disks and said prism to said photodetector; rotation means to rotate said photochromic disks about their common axis; first and second modulated WRITE light sources responsive to first and second input signals respectively, said light having a color effective to cause a given change in opacity in said photochromic disks; means to direct the light from said first and second WRITE light sources on to a small area of said first and second disks respectively, said area being eccentrically disposed with relation to said READ beam but collinearly disposed with respect to each other; means to direct an ERASE light on a small area of each photochromic disk at a location such that the area will be exposed to the ERASE light just before exposure to the corresponding WRITE light, said ERASE light having a color effective to reverse any opacity changes caused by previous exposure to said WRITE light; said rotation means being arranged to rotate said Dove prism at a rate such that an image of said first photochromic disk projected on to said second photochromic disk will scan the second disk several times before a given signal is erased; and an oscilloscope connected to receive output signals from said photodetector and sweep synchronizing signals from said rotating means.

References Cited

UNITED STATES PATENTS

| | | | |
|---|---|---|---|
| 3,085,469 | 4/1963 | Carlson | 250—229 X |
| 3,134,297 | 5/1964 | Carlson et al. | 350—160 |
| 3,134,674 | 5/1964 | Brown | 350—160 X |
| 3,185,026 | 5/1965 | Carlson et al. | 350—160 X |

JAMES W. LAWRENCE, *Primary Examiner.*

V. LAFRANCHI, *Assistant Examiner.*